(No Model.)
C. S. UPTON.
ROPE AND CORD FASTENING.
No. 277,632.  Patented May 15, 1883.
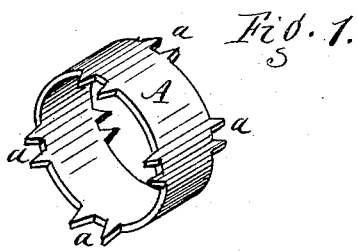
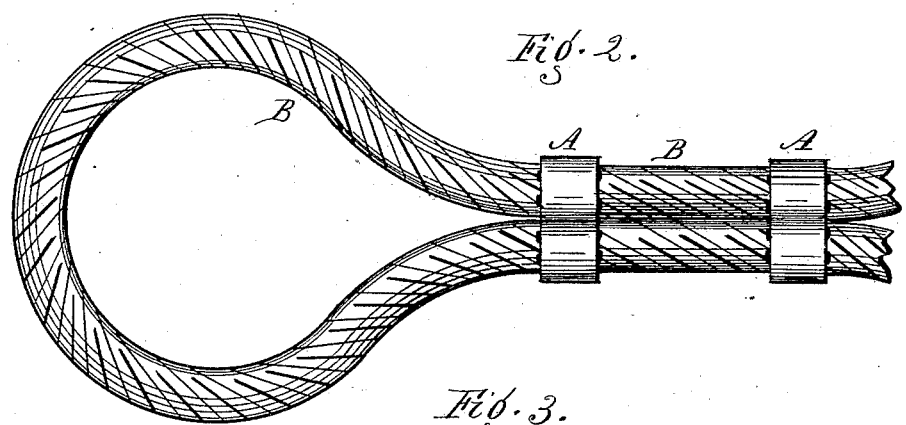
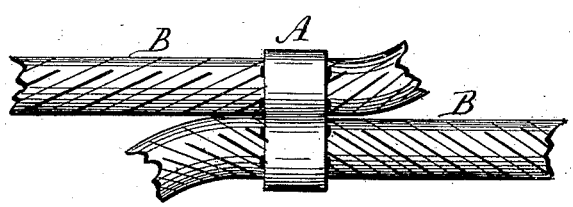
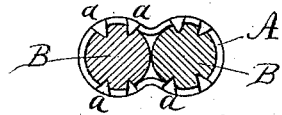
Attest.
E. P. Follett
Chauncey Perry
Inventor.
Charles S. Upton.
per R. F. Osgood,
atty.
N. PETERS. Photo-Lithographer, Washington, D. C.

UNITED STATES PATENT OFFICE.

CHARLES S. UPTON, OF SPENCERPORT, NEW YORK.

ROPE AND CORD FASTENING.

SPECIFICATION forming part of Letters Patent No. 277,632, dated May 15, 1883.

Application filed June 8, 1882. (No model.)

*To all whom it may concern:*

Be it known that I, CHARLES S. UPTON, of Spencerport, Monroe county, New York, have invented a certain new and useful Improvement in Rope and Cord Fastenings; and I do hereby declare that the following is a full, clear, and exact description of the same, reference being had to the accompanying drawings, in which—

Figure 1 is a perspective view of the fastening device. Fig. 2 is a plan view of two of the devices applied to a rope and forming a loop therein. Fig. 3 is a similar view, showing one of the devices attaching the two ends of a rope. Fig. 4 is a cross-section of Fig. 3.

My improvement relates to devices for fastening the ends of ropes and cords, or for forming loops therein; and it consists of a ferrule or ring made entire in one piece, without joint, having teeth or spurs on each side of the center, which stand horizontally or parallel with the sides of the ferrule, the ends of the rope being inserted through the ferrule, and the ferrule being then clamped down in the middle, and the spurs or teeth being also bent down into the rope, all as hereinafter described.

In the drawings, A shows the ferrule, the same being simply a ring of malleable, wrought, or other suitable iron or metal, made entire in one piece, without joint, and provided on one or both ends with sharp-pointed spurs $a\ a$, which project horizontally beyond the edge of the ferrule, as shown in Fig. 1.

In use the two ends of the rope B are passed through the circular ring, resting side by side, and then with a suitable instrument the center part of the ring is flattened or dented down between the ends of the rope, which clamps them both, as shown in Fig. 4. The same action which compresses the ring upon the rope also presses the spurs $a\ a$ down from a horizontal into a vertical position and causes said spurs to bite into the rope, and by this means the rope is not only clamped and held, but the ring is kept from slipping on the rope by reason of the teeth setting into the body of the rope. A single fastening may be used, as shown in Fig. 3, or two or more, as shown in Fig. 2.

The device is applicable in all cases where a loop is to be formed in rope, or where two ends of rope are to be attached together, and may be used for many purposes; but it is specially applicable in halters where the hitching-strap is made of rope, such as is shown in Patent No. 255,395.

The ferrule is best made from malleable iron, but can be made from brass or other metals.

Having thus described my invention, I disclaim a clasp having vertical teeth or spurs, such as are employed for securing suspender-ends.

What I claim as my invention is—

A rope or cord fastening clamp, A, formed in an entire ring, with spurs $a\ a$ projecting from its edges parallel with the line of the rope or cord to be clamped thereby before the insertion of the said rope or cord, the said spurs being adapted to be bent inward into the rope or cord, after the insertion thereof in the ring, and the ring adapted to be then flattened or shaped closely around the parts of the rope or cord, substantially as and for the purpose herein specified.

In witness whereof I have hereunto signed my name in the presence of two subscribing witnesses.

CHARLES S. UPTON.

Witnesses:
R. F. OSGOOD,
E. P. FOLLETT.